UNITED STATES PATENT OFFICE.

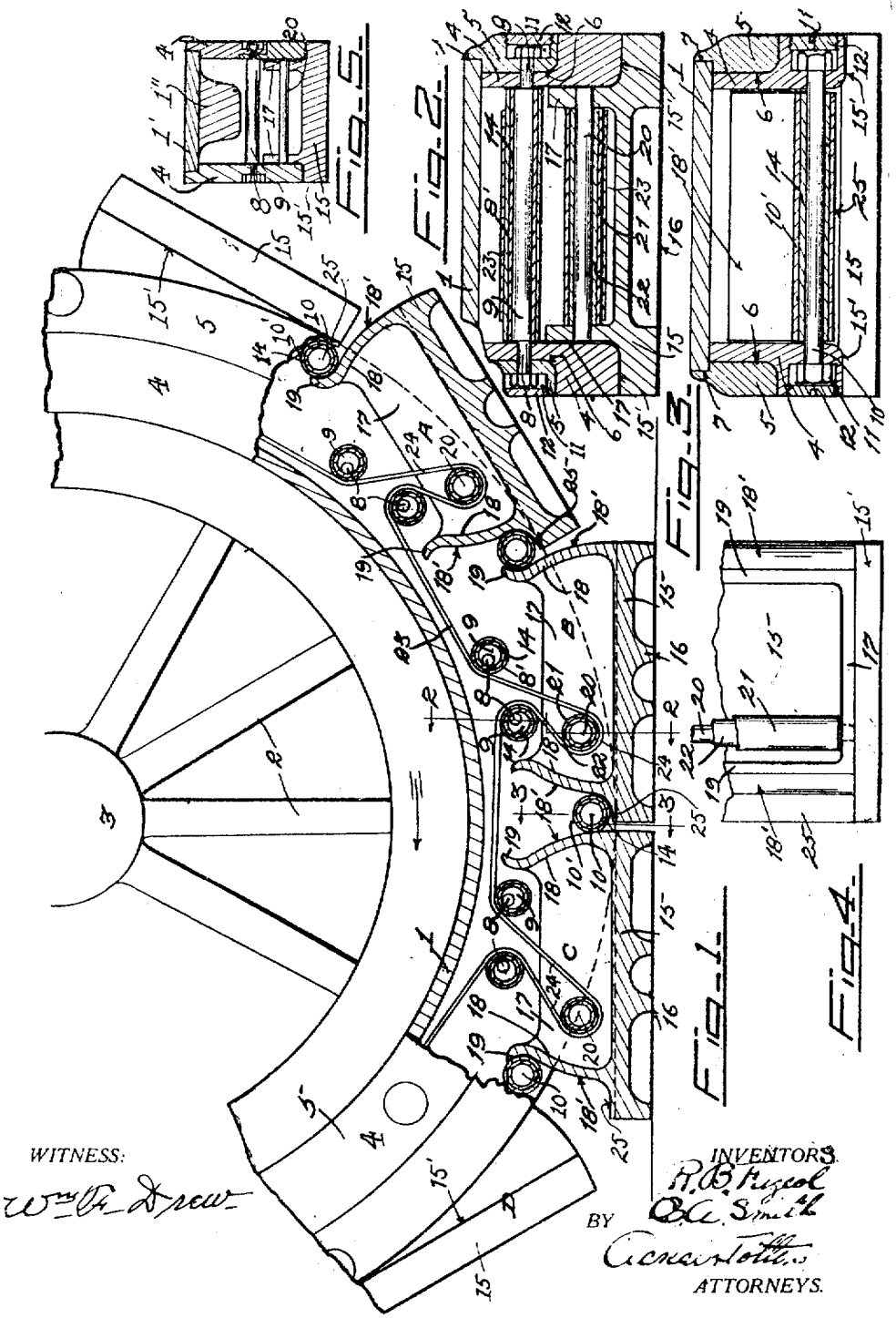
R. B. FAGEOL & C. A. SMITH.
TREAD FOR TRACTOR WHEELS.
APPLICATION FILED APR. 16, 1917.
1,268,445. Patented June 4, 1918.

ROLLIE B. FAGEOL, OF OAKLAND, AND CHARLES A. SMITH, OF SAN FRANCISCO, CALIFORNIA.

TREAD FOR TRACTOR-WHEELS.

1,268,445.  Specification of Letters Patent.  Patented June 4, 1918.

Application filed April 16, 1917. Serial No. 162,269.

*To all whom it may concern:*

Be it known that we, ROLLIE B. FAGEOL and CHARLES A. SMITH, citizens of the United States, residing, the said FAGEOL at Oakland, in the county of Alameda and State of California, and the said SMITH in the city and county of San Francisco, State of California, have invented certain new and useful Improvements in Treads for Tractor-Wheels, of which the following is a specification.

The present invention relates to road-running traction treads particularly adapted for the wheels of self-propelled and tractor vehicles, such as motor trucks, traction engines, and the like.

The object of the invention is to provide a wheel tread for the described purpose, which presents a comparatively large and flat bearing surface for contact with the ground, to secure the greatest possible traction, without necessitating the use of sharp projecting cleats or other ground-gripping devices, which necessarily break up and destroy the surface over which they travel. Our wheels can therefore be effectively used upon vehicles traveling upon unpaved roads, and on heavy roads overcome the road resistance at the same time furnishing a sufficient bearing area to insure the necessary traction and compress the loose top soil thereof. In fact, our improved wheel, presenting as it does a very much greater tread surface than a plain smooth-tired wheel is less harmful to the road surface.

Our invention will be hereinafter described in its preferred form, and it is so illustrated, but is is to be understood that changes, within the scope of the claims hereto appended, may be made in the form and construction of the device without departing from the spirit of the invention.

With this in view, our invention will now be fully described with reference to the accompanying drawings, wherein—

Figure 1 is a part-sectional side elevation of a portion of our improved traction tread as applied to a wheel specially built to receive it.

Figs. 2 and 3 are transverse sections through the tread portion of our wheel, taken in the direction of the arrows respectively on the lines 2—2 and 3—3 of Fig. 1.

Fig. 4 is a plan view of a portion of one of the tread shoes.

Fig. 5 is a transverse section, reduced in size, showing our tread as applied to a wheel of the usual type, the tread in this case being an attachment.

In the drawings, the reference numeral 1 designates the rim of a wheel having the usual spokes 2 and the hub 3. A pair of spaced flanges 4, lying in the plane of the wheel and positioned one near each side of the rim 1, are provided immediately outside said rim and are retained thereupon by annular locking flanges 5 adapted to lie within annular grooves 6 formed in the outer surfaces of said flanges 4 and provided with grooves 7 at their peripheries adapted to engage the edges of the rim 1. A series of transverse pins or bolts 8 are passed through the flanges 4 and the locking flanges 5 and each is provided at each end with a nut, by means of which it may be made secure. The bolts 8 are formed with eccentric central portions 9 adapted to lie between the flanges 4 and to space the same. The bolts 8 are disposed in pairs near the inner peripheral edges of the flanges 4, as shown in Fig. 1 of the drawings.

Near the outer edges of the flanges 4 is a series of transverse pins or bolts 10, there being one of said bolts 10 positioned midway between each two adjacent pairs of bolts 8. The nuts of the transverse bolts 8 and 10 lie within recesses 11 formed in the flanges 4 and 5 and are inclosed to exclude grit and dust by means of removable screw plugs or caps 12.

The bolts 8 and 10 are surrounded by rotatable sleeves 8' and 10' respectively, preferably formed of steel or other hard material; and interposed between said sleeves and the bolts 8 and 10 are anti-friction bushings 14 of any well known form or material adapted to insure the free movement of the sleeve at all times. Said bushings are preferably of the well known self lubricating type.

A series of tread shoes 15 is disposed about the peripheral edge of the wheel, each having an inwardly extending portion adapted to lie between the said flanges 4 and to be slidably movable between said flanges. The outer portions of said tread shoes are flat and may be formed, if desired, with serrated or irregular surfaces 16 adapted to lie upon and grip the ground, and with lateral shoulders 15' adapted for engagement with the peripheral edges of said flanges 4. The inwardly projecting portion of each tread shoe, all of which are alike in construction, comprises a pair of spaced lineally disposed flanges 17 adapted to lie immediately within the wheel flanges 4 and a pair of transversely disposed end flanges 18 formed with exterior involute bearing surfaces 18', adapted to lie between adjacent transverse pins 10 and to bear against the sleeves 10' mounted thereupon. The inner edge portion of said transverse end flanges 18 are formed with outwardly curled portions 19 to prevent the complete removal of the tread shoe past the transverse pins 10.

Each tread shoe carries a transversely disposed pin 20 upon which is mounted a rotatable sleeve 21. An anti-friction bushing 22 is preferably interposed between said pin and said sleeve as in the case of the previously described pins 8 and 10. An endless belt 23 is passed around the periphery of the wheel in the manner shown in Fig. 1 of the drawings, passing under the pins 8 and forming a loop 24 between the two members of each pair of said pins and said loop being passed over the pin 20, carried by the tread shoe. The tread shoes are thus held in position between the flanges 4 of the wheel rim by means of the belt 23 and its engagement with the pins 20 of said tread shoes.

The action of said wheel may be described as follows: The form of the involute bearing surfaces 18' is such, that as one end of the tread shoe is retracted toward the center of the wheel the other end of said shoe must move outwardly away from the center so that the shoe may thus have a rocking movement in the plane of the wheel; the pin 20 of the tread shoe being nearer one end thereof, a pull on the belt 23 causes the end of the tread shoe carrying said pin to move inwardly, and the opposite end of said shoe to move correspondingly outwardly. This is the normal position of the tread shoes when out of contact with the ground, as shown at A in Fig. 1. The opposite end of said tread shoe is prevented from further outward movement by the curled end 19 of its involute bearing surface. This position of the tread shoe as shown at A causes said shoe to lie flat upon the ground, as shown at B, when said shoe is brought into contact with the ground surface, it being understood that the wheel is revolving in the direction of the arrow and therefore moving bodily over the ground in the opposite direction.

The belt 23 is provided with enough slack to permit one of the tread shoes of the series to occupy the position relative to the wheel shown at C, where the end of said shoe carrying the pin 20 is moved outwardly to its extreme outward position and the opposite end of said shoe is moved inwardly to its extreme inward position. This position of the tread shoe, shown at C, is caused by its contact with the ground and the weight of the wheel thereupon. In this connection it should be stated that the weight of the wheel of the vehicle is carried by the outer peripheral edges of the rim flanges 4 resting and rolling upon the lateral shoulders 15' of the tread shoes 15, said shoulders forming a continuous flat track upon which the wheel rolls. Thus it will be seen that in passing from the position B to the position C, the tread shoe remains flat upon the ground and changes its position relative to the wheel by reversing the relative positions of its ends with respect to the pins 10 in engagement therewith. Two tread shoes are thus at all times in flat contact with the ground, and as the wheel revolves and the tread shoe is lifted from the position C, it is caused to return to its normal position relative to the wheel rim, as shown at D, by the belt 23 being pulled outwardly by the movement of the succeeding tread shoe as it moves into its position C, the length of the belt allowing only one shoe to occupy the reversed position as shown at C. An ample traction surface, comprising the length and width of two tread shoes, is thus provided at all times for the wheel.

The pins 8 are, as before stated, eccentrically mounted in the rim flanges and may be rotated therein upon the loosening of their respective nuts. By the rotation of said pins 8 the belt 23 may be tightened to reduce the amount of slack therein to the desired quantity. It should be mentioned in this connection that said belt is formed of some relatively non-elastic material, for the proper action of the tread depends upon the amount of slack in said belt.

Our improved tread may be constructed as a device to be attached to a wheel of the usual type and equipped with the usual tire. In this case, as illustrated in Fig. 5 of the drawings, the flanges 4 are adapted to be clamped upon the edges of the usual rim 1', to which the tire 1" is attached. The action of the tread in this connection is identical with that described above, the only difference being that it is adapted for use upon existing wheels of the ordinary type, so that a vehicle equipped with the usual wheels may be readily transferred into a vehicle having our improved tread, without necessitating the construction of entirely new wheels.

Having thus described our invention what we claim as new and desire to protect by Letters Patent is:—

1. A detachable traction tread for wheels and for removably positioning over the tire thereof comprising a pair of laterally spaced flanges forming a peripheral rim carried by the wheel, a plurality of spaced transversely disposed bearing members between said flanges, a series of tread shoes carried one between each two adjacent bearing members and movable thereupon, a flexible connection between said tread shoes and said flanges adapted to permit a plurality of said tread shoes to have simultaneous contact with the ground, and a pair of annular locking flanges coöperating with said rim flanges and the wheel tire for retaining the tread thereon.

2. A tread for traction wheels comprising a rim carried by the wheel, a series of tread shoes peripherally disposed about said rim and movable with respect thereto and an endless flexible member associated with said rim for retaining said tread shoes in operative relation therewith.

3. A tread for traction wheels comprising a rim carried by the wheels, a plurality of guide members carried by said rim, a series of tread shoes peripherally disposed about said rim, a guide member carried by each tread shoe, and an endless flexible member passing under the guide members of said rim and over the guide members of said tread shoes for retaining said tread shoes in operative relation with said rim.

4. A tread for traction wheels, comprising a rim carried by the wheel, a series of tread shoes peripherally disposed about said rim and adapted for rocking movement with respect thereto in the plane of the wheel, and an endless flexible member associated with said rim and said tread shoes for retaining the latter in position and permitting a plurality of said tread shoes to have simultaneous contact with the ground.

5. A tread for traction wheels comprising a pair of laterally spaced annular flanges forming a peripheral rim carried by the wheel, a series of tread shoes peripherally disposed about said flanges, each tread shoe having an inner portion adapted to lie between said flanges and an outer portion adapted for contact with the ground, said outer portion having lateral shoulders upon which the flanges of said rim are adapted to ride, coöperating members carried by said flanges and the inner portions of said tread shoes for permitting said shoes to have rocking movement with respect to said flanges in the plane of the wheel, and flexible means for connecting said tread shoes with said flanges to permit a plurality of said tread shoes to have simultaneous contact with the ground.

6. A tread for traction wheels comprising a pair of laterally spaced annular flanges forming a peripheral rim about the wheel, a plurality of tread shoes peripherally disposed about said rim, each having a portion adapted to lie between said flanges and to have rocking movement with respect thereto in the plane of the wheel, bearing members carried by said flanges for limiting the movement of said tread shoes, a series of transversely disposed guide members carried between said flanges, a transversely disposed guide member carried by each tread shoe, an endless flexible member associated with the guide members of said flanges and said tread shoes for retaining the latter in position, said flexible member permitting the rocking movement of said tread shoes, and means for adjusting the operative length of said endless flexible member.

In testimony whereof we have signed our names to this specification in the presence of two subscribing witnesses.

ROLLIE B. FAGEOL.
CHARLES A. SMITH.

Witnesses:
HARRY A. TOTTEN,
D. B. RICHARDS.